March 8, 1949.  A. M. ROSS  2,464,186
WELDING WIRE
Filed Nov. 15, 1945  3 Sheets-Sheet 1
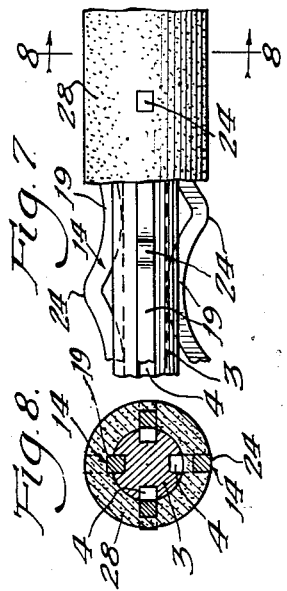
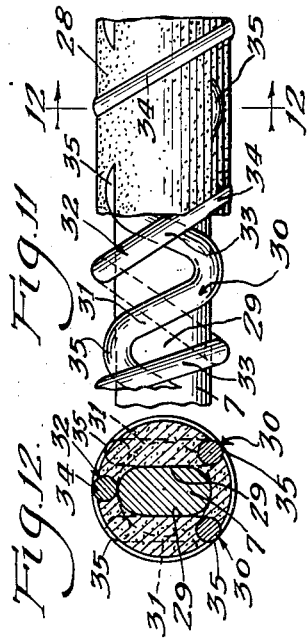
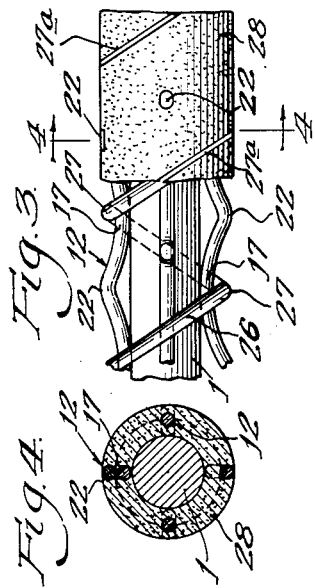
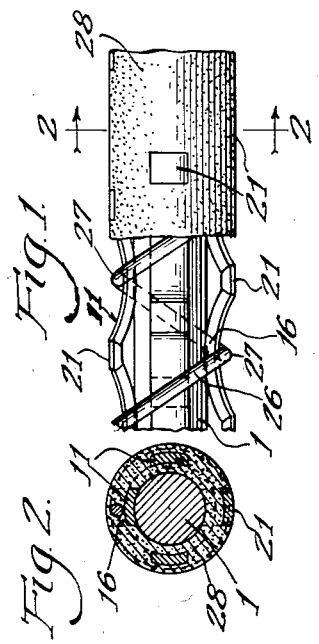
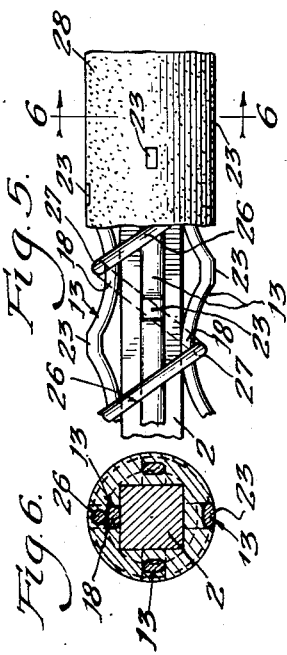
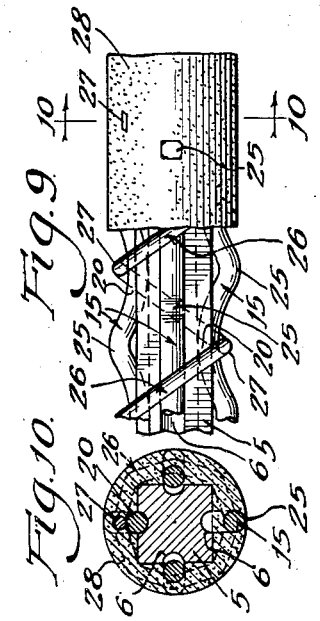
Inventor:
Albert M. Ross
By Louis A. Bisson,
Attorney

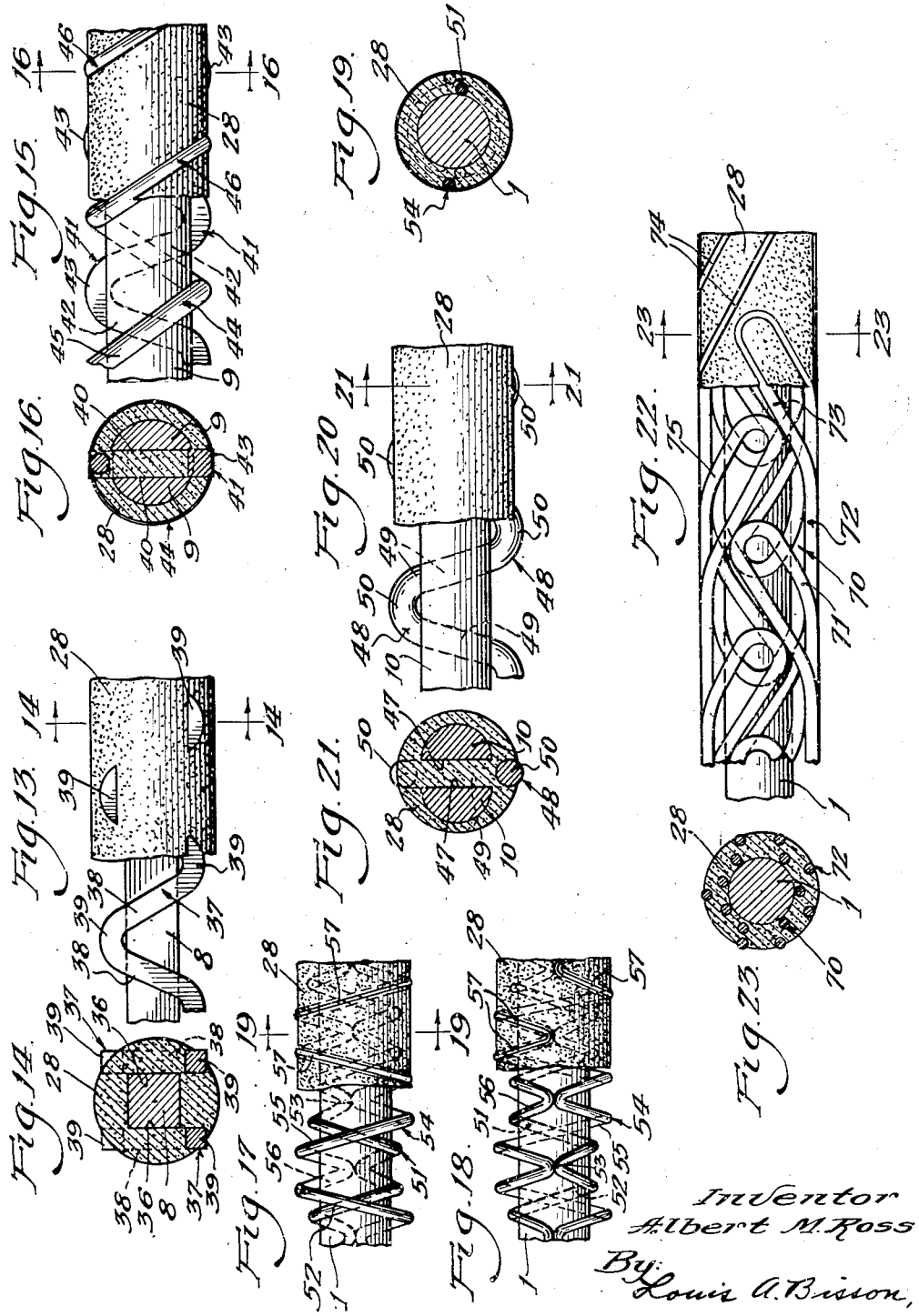

March 8, 1949.  A. M. ROSS  2,464,186
WELDING WIRE
Filed Nov. 15, 1945  3 Sheets-Sheet 3
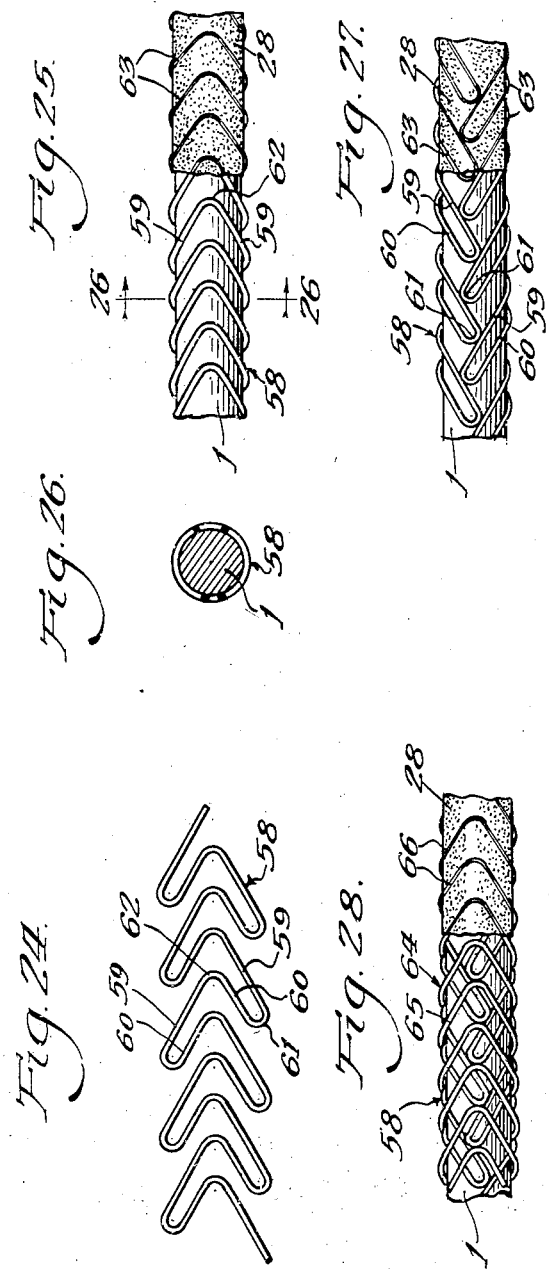
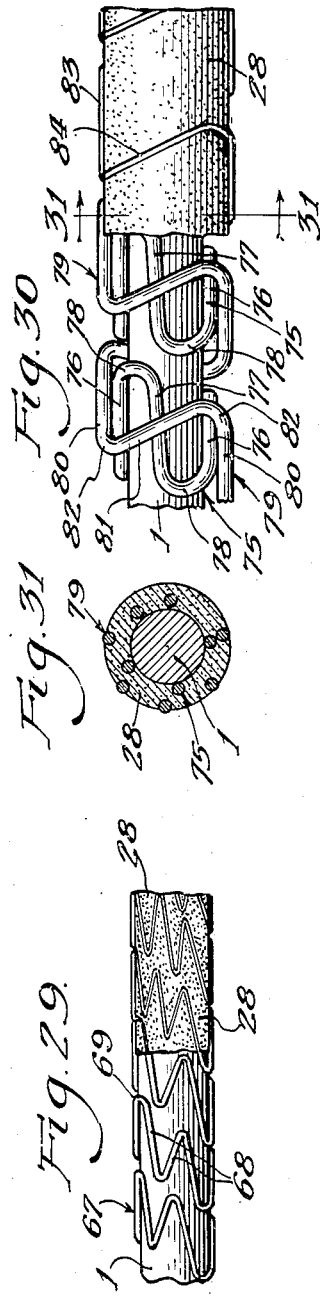
Inventor:
Albert M. Ross
By Louis A. Bisson,
Attorney.

Patented Mar. 8, 1949

2,464,186

UNITED STATES PATENT OFFICE 2,464,186

WELDING WIRE

Albert M. Ross, Westmont, Ill., assignor of one-half to William S. Gilpin, La Grange, Ill., and one-half to National Cylinder Gas Company, Chicago, Ill., a corporation of Delaware Application November 15, 1945, Serial No. 628,711

11 Claims. (Cl. 219—8)

The present invention relates to flux-coated welding wire or rods that may be used in fusion welding, as by gas or electric arc welding, in any length, as in short length form, or in coil form, for continuous and automatic welding, and the like.

Among the objects of the invention is to provide a novel device or means which has a longitudinal core, which may be of metal, or fusible material, a sheathing of molded flux material on the core, and longitudinally-extending metal, or the like, strip or strips in contact with the core, mainly imbedded in the flux material, and having spots or areas of contact with the core, and also having exposed spots or areas of contact at or outwardly of the surface of the flux material sheathing for making contact with an electrical sheathing, or the like, of metal, fusible material, carbon, or the like, in which the welding rod or wire as a whole is fed during use. The strip or strips mentioned may be composed of wave-shaped, undulated, bent, looped, or otherwise configurated metal, or like elements, and may be composed of a primary strip contacting the core and imbedded in the flux material sheathing, and a secondary strip contacting the primary strip and imbedded in the flux material sheathing except at spots or loci having substantial spot or area portions exposed at or just outside of the outer surface of the flux material sheathing to make contact with the electrode sheathing referred to above.

Welding devices of the fusion type, whether of the gas, carbon-arc, or metallic-arc type, operate from the production of heat. In the flux-coated wire type of welding means, it is desirable and necessary to have means for shielding the molten metal during welding; to blanket and retard the cooling rate so as to obtain high weld physicals; to have a uniform concentric flux coating, which in some cases may be as small as 1% of the weight of the welding rod or wire, and in other cases may be as great as 30% of the weight of the welding rod or wire; to be externally flux coated; to have reinforcement to permit flexing and also coiling of the wire, as on a reel from which the wire is fed when in use; to be capable of being subjected to external pressure, by any feeding means, when welding without the flux becoming distorted or displaced; and to have a combinative structure for alloying. In the case of metallic arc welding, the device must be capable of using current contacting means, such as an exterior electrode sheathing, or the like, with which the welding means will have substantial area spot or loci contact rather than mere point contact; also capable of free passage or path of current to and through the core or mass, and to have an axial arc characteristic which will remain axial and not float or waiver.

Heretofore, extruded or dipped flux coating has not permitted coiling of the welding rod or wire, as a whole, as on a reel; has not been uniformly concentric, it being impossible and impracticable to obtain and to maintain uniform concentricity; has not had definite means for controlling the ratio of flux in the welding rod or wire as a whole; had no exterior contacting means; had a rotating or unstable arcing characteristic; and had mere point contact rather than spot and area contacts. Such welding wires had notches or grooves for carrying the fluxing material, braided casings, or helical wrappings imbedded in the fluxes, and sheathed or encased welding wires or those contained within the bore of the rod.

The present invention comprehends simple means possessing all of the above mentioned advantages and avoiding all of the disadvantages heretofore present; a welding wire which meets the requisites of all flux-coated welding wires that may be used in all fusion welding, whether gas, or electric arc, in manual, semi-automatic or full-automatic welding apparatus.

I have discovered that I can use longitudinal strips, as primary strips, or as both primary and secondary strips, simply laid along the core, and these strips are preferably of wave or undulated form, or bent or otherwise configurated, or of tortuous form, and that the laps or bites of the waves, undulations, bends, or the like, may be in planes radial to the axis of the core, or in planes parallel to such axis, or in curved surfaces about or around the core, or the like, and that such strips are merely superposed on the core or upon each other without any interlacing or intermeshing, or interweaving, or inter-braiding, or the like. Each strip may simply rest along the surface of the core, or be partly imbedded in the core, to run parallel to the axis of the core, be imbedded within the core, as in planes including the axis of the core, or in planes parallel to the axis of the core, or surfaces concentric with such axis, as partly or fully around the core, and with right and left lag, or overlay or overlap, or in combinations of them.

Other objects, advantages, capabilities, features and the like are comprehended by the invention as will later appear, and as are inherently possessed by the invention.

Referring briefly to the drawings:

Figs. 1, 3, 5, 7, 9, 11, 13, 15, 17, 18, 20, 22, 25, 27, 28, 29 and 30 are side views with parts broken away of segments of different forms of welding wires constructed in accordance with the invention;

Figs. 2, 4, 6, 8, 10, 12, 14, 16, 19, 21, 23, 26 and 31 are transverse sectional views taken in planes represented by lines 2—2, 4—4, 6—6, 8—8, 10—10, 12—12, 14—14, 16—16, 19—19, 21—21, 23—23, 26—26 and 31—31 taken respectively in Figs. 1, 3, 5, 7, 9, 11, 13, 15, 17, 20, 22, 25 and 30 of the drawings; and Fig. 24 is a view of a part before application in place as shown in Fig. 25.

Referring more in detail to the drawings, the several embodiments chosen to illustrate the invention are shown as comprising a central metal, carbon, or similar core, which is in the form of a round or cylindrical rod or wire 1 as shown in Figs. 1, 2, 3, 4, 17, 18, 19, 22, 23, 25, 26, 27, 28, 29, 30 and 31; or in the form of a rod or wire 2 which is of polygonal form, as square or rectangular, in cross section, as shown in Figs. 5 and 6; or in the form of a rod or wire 3 that is round or circular in cross section and having longitudinal channels or flutes 4, as shown in Figs. 7 and 8; or in the form of a rod or wire 5 that is of polygonal form, as square or rectangular, in cross section and having longitudinal channels or flutes 6, as shown in Figs. 9 and 10; or in the form of a rod or wire 7 which is of oval or like cross sectional form, as shown in Figs. 11 and 12; or in the form of a rod or wire 8 which is of polygonal form, as square or rectangular, in cross section, as shown in Figs. 13 and 14, or in the form of rods or wires 9, 9 which are segmental or part-round in cross section, as shown in Figs. 15 and 16; or in the form of rods or wires 10 which are segmental, or semi-circular; or half round, in cross section, as shown in Figs. 20 and 21.

Referring to the forms shown in Figs. 1–10, inclusive, upon the central core 1, 2, 3 or 5, are disposed primary strips or members as in the nature of longitudinal metal rods or wires 11 (Figs. 1 and 2), 12 (Figs. 3 and 4), 13 (Figs. 5 and 6), 14 (Figs. 7 and 8), and 15 (Figs. 9 and 10). All these rods or wires are preferably of wave form, or undulated, or bent, longitudinally, and have trough portions 16, 17, 18, 19 and 20 respectively of the rods or wires 11, 12, 13, 14 and 15, and these trough parts or portions are in intimate contact with the surface or surfaces of the core or rods 1, 2, 3 and 5 for good conduction of the electrical current when welding, and these rods or wires 11, 12, 13, 14 and 15 also have crest parts or portions 21, 22, 23, 24 and 25 respectively. Along the rods or wires 11, 12, 13 or 15 is a secondary strip or member such as an outer metal rod or wire 26 which may be of helical form or wavy and curved so as to have traversing bites or laps 27 thereof in good contact with the troughs 16, 17, 18 and 19 of the rods or wires 11, 12, 13 and 15, as shown in Figs. 1, 2, 3, 4, 5, 6, 9 and 10.

Referring to Figs. 1 and 2, it will be noted that the primary longitudinal rods or wires 11 are arc-shaped in cross section so as to afford a large area contact with the core 1 in the trough portions 16 of the rods or wires 11. At the crests 21 the outer surface portions of these portions 21 also offer a large area surface for good and extended contact with the electrode sheathing (not shown) in which the welding rod or wire, as a whole, is fed during use.

Referring to Figs. 3 and 4, the primary longitudinal rods or wires 12 may be generally round in cross section but at the trough 17, where there is contact with the core 1, the trough portions 17 are preferably flattened to offer an area of contact with the core 1, and the crest portions 22 are also preferably flattened to offer an area of contact with the electrode sheathing (not shown) in which the welding rod or wire, as a whole, is fed during use.

Referring to the form shown in Figs. 5 and 6, the primary longitudinal rods or wires 13 may be generally of oval shape or the like in cross section with the trough portions 18 having large area contact with the core 2, and with the crest portions 23 having a large area contact with the electrode sheathing (not shown) in which the welding rod or wire, as a whole, is fed during use.

Referring to the form shown in Figs. 9 and 10, the primary longitudinal rods or wires 15 may be round in cross section and the trough portions 20 thereof fit into the channels or flutes 6 with a large area contact with the base of the channels or flutes 6 and hence the core 5, and the crests 25 are preferably flattened to offer large area contact with the electrode sheathing (not shown) in which the welding rod or wire, as a whole, is fed during use.

Referring to Figs. 7 and 8, the primary longitudinal rods or wires 14 are preferably of square or rectangular cross sectional form and have the troughs 19 thereof fitting with a large area contact in the channels or flutes 4 of the core 3, and the crests 24 thereof also offer large area contacts with the electrode sheathing (not shown) in which the welding rod or wire as a whole is fed during use.

Upon the core 1, 2, 3 or 5 and about the rods or wires 11, 12, 13, 14 or 15, and the rods or wires 26, is molded flux material 28 so that the rods or wires 11, 12, 13, 14 and 15, as also the rods or wires 26, are imbedded therein except for the crests 21, 22, 23, 24 and 25 and also the bites 27 of the rod or wire 26, which are exposed at or slightly above the outer surface of the flux sheathing 28 for affording contact with the electrode sheathing (not shown) in which the welding rod or wire as a whole is fed during use.

In Figs. 3 and 4, by reason of the secondary rod or wire 26 being helical, its outer surface portion 27 is exposed at or slightly beyond the outer surface of the flux material sheathing 28.

Referring to Figs. 11 and 12, the core 7 is shown as of ovate or elongated form in cross section with opposed flat or substantially flat faces 29, 29, and on or against these faces 29, 29 are disposed primary elongated metal members or strips 30, 30 which are of wave form, undulated, bent, or otherwise configurated with the bites or convolutions 31 thereof lying in a plane or planes so as to lie flat against the faces 29 of the core 7. Around or about these members 7 and 30 is a secondary or outer metal elongated member 32 which may be of helical form with the convolutions 33 thereof crossing over the laps or bites 31 of the members 30 and being in good contact therewith and firmly holding the primary strips or members 30 in intimate contact with the core 7. In this form, as in the forms shown in Figs. 1–10, also is provided molded flux material 28 which is so disposed that the surface portions 34 of the member 32 will be exposed at or outside of the outer surface of the flux material sheathing 28. Also, the primary members 30 have bends or lobes 35 which are exposed at or outside of the outer surface of the flux material sheathing 28, for affording contact with the electrode sheathing (not shown) in which the welding rod or wire as a whole is fed during use.

Referring to Figs. 13 and 14, the core 8 is of polygonal form, as square or rectangular, in cross section, and has opposed flat or substantially flat surfaces or faces 36, 36 and on these faces 36 are disposed elongated metal strips or members 37 which may be of wave or undulated or bent form with the convolutions 38 thereof lying in planes so as to lie flat against the sides 36 of the core 38. The member 37 is shown to be polygonal in cross section, as square or rectangular, so that it will have flat faces or substantially flat faces in contact with the flat faces 36 of the core 8. About or around these members 8 and 37, as in the forms shown in Figs. 1–12, is provided molded flux material 28, and the members 37 have bends 39, a portion of which is exposed at or extends out beyond the outer surfaces of the flux material sheathing 28, for affording contact with the electrode sheathing (not shown) in which the welding rod or wire as a whole is fed during use.

Referring to Figs. 15 and 16, the core 9, 9 is shown as composed of rods or wires which are segmental or part round in cross section with internally opposed flat or substantially flat faces 40, 40 spaced apart, and in between them and in contact with the faces 40, 40 is a primary elongated metal strip or member 41 which is preferably of wave form or undulated, or bent, and also of polygonal form, as square or rectangular, in cross section with the convolutions or laps 42 of the strip 41 lying in a plane so that they lie flat and in contact with the faces 40, 40, of the core parts 9, 9. This primary strip 41 has bends 43 which are exposed at or extend outwardly beyond the outer surface of the flux material sheathing 28 surrounding the welding rod or wire, as in the forms shown in Figs. 1–14. About or around the core 9, 9 and the primary strip or member 41 is a secondary longitudinal strip or member 44 which may be of helical or like form with the convolutions 45 thereof in contacting engagement with the core parts 9, 9 so as to hold the latter in contact with the primary strip or member 41. The convolutions 45 of the strip 44 are disposed to have the outer part 46 thereof exposed at or outside of the flux material sheathing 28 to afford contact with the electrode sheathing (not shown) in which the welding rod or wire as a whole is fed during use.

Referring to Figs. 20 and 21, the core 10, 10 is shown as composed of rods or wires which are segmental or half-round in cross sectional form with internally opposed flat or substantially flat faces 47, 47, spaced apart, and in between them and in contact with the faces 47, 47 is a primary elongated metal strip or member 48 which is preferably of wave or undulated form or of bent form, with laps 49 and bends 50, and being substantially round in cross section, with the convolutions or laps 49 of the strip 48 lying in a plane so that they lie flat and in contact with the faces 47, 47 of the core parts 10, 10. The contacting sides of the laps 49 may be flattened to afford large area contact with the faces 47, 47. This primary strip 48 has bends 50 which are exposed at or extend outwardly beyond the outer surface of the flux material sheathing 28 surrounding the welding rod or wire as in the forms shown in Figs. 1–16.

Referring to Figs. 17, 18 and 19, the core rod or wire 1 is round or cylindrical in form and has extending along the surface thereof a primary elongated metal strip or member 51 which is preferably of wave form or undulated, or bent, and also transversely curved to partly surround and clasp the core 1, this strip or member comprising bites, laps or convolutions 52 curved about the core 1 and having apical portions 53 at the ends of the bites or laps, or the like, 52, as shown in Figs. 17, 18 and 19 of the drawings. On one side of the core, as shown in Fig. 17, the bites or laps, or the like, 52 lie transverse such side while also curving around it, and the apical portions 53 extend over to the opposite side of the core 1. On the core 1 is the flux material sheathing 28, as in the forms shown in Figs. 1–16, and Figs. 19, 20 and 21 and in this sheathing the strip or member 51 is imbedded. Extending along and upon this strip or member 51 is a secondary elongated metal strip or member 54, which is also preferably of wave, or undulated, or bent form having transversely and curved bites, laps, undulations or bends 55 to partly surround and clasp the primary strip or member 51, and also having at the ends of these bites or laps 55 apical portions 56 which extend over to the opposite side of the core 1 and adapted to overlie and contact the apical parts or portions 53 of the primary strip or member 51. The secondary strip or member 54 has its outer surface portion 57 exposed at or extending outwardly beyond the outer surface of the flux material sheathing 28 surrounding the welding rod or wire 1, and the primary strip or member 51, to afford contact with the electrode sheathing (not shown) in which the welding rod or wire, as a whole, is fed during use.

Referring to Figs. 24, 25, 26, 27 and 28, the core rod or wire 1 is of round or cylindrical form and has extended along the surface thereof a primary elongated metal strip or member 58 having laps or bites 59 and 60 which are curved transversely of the core to partly surround it and to clasp it, and these laps run to bends 61 and 62, as shown more particularly in Fig. 24, which shows the strip or member 58 before it has been curved around the core 1. On the rod or wire 1, as in the other figures of the drawing, is a flux material sheathing 28, which partly or in the main imbeds the strip or member 58, so as to leave, as shown in Figs. 25 and 27, outer surface parts or portions exposed at or extending outwardly beyond the outer surface of the sheathing 28 to afford contact with the electrical sheathing (not shown) in which the welding rod or wire as a whole is fed during use. In Fig. 28 is shown a secondary strip or member 64 extending along and over the primary strip 58 and having laps or bites 65, corresponding to the laps or bites 59 and 60 shown in Fig. 24, and which are curved to cross over or lie transversely of the laps or bites 59 and 60 of the primary strip 58 underneath the strip or member 64 (see Fig. 28). This strip 64 in all respects is the same as the strip 58 but is overlaid upon the strip 58 in inverse relation so that the laps or bites of the one will cross with the laps or bites of the other, as shown in Fig. 28, and also that only the secondary, in this case, has exposed portions 66 at or extending outwardly beyond the outer surface of the flux material sheathing 28 surrounding the welding rod or wire 1, and the primary strip or member 58, to afford contact with the electrode sheathing (not shown) in which the welding rod or wire as a whole is fed during use.

The form shown in Figs. 22 and 23 is similar to the form shown in Fig. 28, and as shown, has on the core rod or wire 1 a primary elongated metal strip or member 70 composed of loop portions 71 which are arranged in staggered relation and laterally curved to partly or mainly lap around or clasp the core rod or wire 1, and to be imbedded in the flux material sheathing 28. Upon this strip or member 70 is a like and secondary strip or member 72 also having loop parts or portions 73 which are arranged in staggered relation and laterally curved to partly or mainly lap around or clasp the primary strip or member 70, but so offset that the loops 73 will extend transversely over the loops 71 of the strip or member 70, and the strip or member 72 has exposed portions 74 at or extending outwardly beyond the outer surface of the flux material sheathing 28 surrounding the welding rod or wire 1, and the primary strip or member 70, to afford contact with the electrode sheathing (not shown) in which the welding rod or wire as a whole is fed during use.

Referring to Fig. 29, upon the core rod or wire 1, preferably of round or cylindrical form, is provided a primary metal strip or member 67 of wave form or undulated or bent to provide laps or convolutions 68 and apical parts or portions 69, as shown in Fig. 29, and this strip or member 67 is preferably wound helically around the core rod or wire 1, and is so imbedded in the flux material sheathing 28 as to be exposed at or outwardly beyond the outer surface of the flux material sheathing 28 to afford contact with the electrode sheathing (not shown) in which the welding rod or wire as a whole is fed during use.

Referring to Figs. 30 and 31, upon the core rod or wire 1, which is of round or cylindrical form, is provided a primary metal strip or member 75 of wave form or undulated or bent to provide laps or bites 76 and 77, with bends or apical portions 78, as shown in Fig. 30, and this strip or member 75, as a whole, is preferably wound in somewhat helical fashion or the like around the core rod or wire 1, so that the laps or bites 76 and 77 may extend or be distributed in a general direction along the core 1. This strip or member 75 is embedded in the flux material sheathing 28 provided on the core 1. Upon this strip or member 75 is provided a secondary metal strip or member 79 of wave form or undulated or bent to provide laps or bites 80 and 81 with bends or apical portions 82, and this strip or member 79 is preferably wound in somewhat helical fashion or the like around the strip or member 75 so that the laps or bites 80 will traverse or cross the laps or bites 76, and the laps or bites 81 will traverse or cross the laps or bites 77. The secondary strip or member 79 is so imbedded in the flux material sheathing 28 on the core 1 and the strip 75 as to expose portions 83 and 84 of the laps or bites 80 and 81 at or outwardly beyond the outer surface of the flux material sheathing 28 to afford contact with the electrode sheathing (not shown) in which the welding rod or wire as a whole is fed during use.

In all the forms above described, where the primary metal strip or member contacts with the metal core rod or wire, and also contacts with the secondary strip or member, while the contacts are sufficient for transmitting of the electrical current; if desired such contacts may be spot welded at the loci of contact, so that the primary may be spot welded to the core and the secondary may be spot welded to the primary strip, but such welding is not deemed essential.

The extent of the lobes or laps or the like of the elements of the strip in whatever direction of extending thereof, whether transversely, arcuately, at an angle or angles to the axis of the core or length of the strip, or even helically about the core, or as of the secondary about the primary, controls the amount of flux material that may be used and also acts as reinforcement for the flux sheathing, as well as to hold the same in place or relation with the welding wire or rod as a whole, as it is wound on a reel or the like, and in the case of using metallic strips or elements whereby exposed portions are located to effect electrical conduction, the same acts to maintain the contact portions in proper position for effecting the desired electrical contact when feeding the welding wire or rod as a whole through the electrode sheathing during the welding operation. Thus, uniform concentric flux coating or sheathing of any amount of material may be secured and maintained, permitting pressure feeding. The combining of metallic core or cores, with the wave-shaped or undulated forms of the strip element or elements, with or without enwrapping metallic element or elements affords facile means of alloying.

Preferably, the flux material or coating, or sheathing, on the core, or the like, is contained or dispersed between and among the elements of the strip or strips, extending to but not covering the exposed spots or area portions which serve as contact loci for efficient electrical current conduction.

The form, as to the transverse cross sectional shape of the element or elements of the strip or strips may be as desired, such as round, oval, square, rectangular, elongated, flat-like, trapezoidal, and the like, and may be of such forms before forming the element or elements and the longitudinal strip forms, and the desired area of the contact portions, may be effected as by a slight reduction of the finished transverse or cross-sectional shape or dimensional extent of the element of the strip. As for example, when using round wire, a diameter of it may be reduced in the order of 0.004" to 0.006" to result in an area or areas of contact which would not be the usual point or line contact. This may be effected when drawing the wire through the drawing die. As a further illustration, if the welding wire be used which has a normal diameter of 0.250" it can be so drawn through the drawing die or dies so that the component diameter may be 0.245" so that such would result in producing contact areas or the like approximately in the order of 0.030" by 0.015" with subsequent enlarged contact areas. Hence, point or like contact is avoided with its unsatisfactory effects.

While I have herein described and upon the drawings shown several embodiments of the invention, it is to be understood that the invention is not limited thereto but comprehends other constructions, details, arrangements of parts, features, and the like, without departing from the spirit of the invention.

Having thus disclosed the invention, I claim:

1. A welding wire of the character disclosed and which has an elongated core with an enveloping sheathing of flux material, an elongated strip extending longitudinally of the core and substantially embedded in the flux sheathing, which strip is of tortuous form to extend about opposite sides of the core and having portions thereof in contact with the core, and a second strip extending longitudinally of the core and in superposed relation to said first elongated strip and substantially embedded in the flux sheathing with portions of said second elongated strip exposed at the surface of the flux sheathing.

2. A welding wire of the character disclosed and which has an elongated core with an enveloping sheathing of flux material, an elongated strip extending longitudinally of the core and substantially embedded in the flux sheathing, which strip is of tortuous form to extend about opposite sides of the core and having portions thereof in contact with the core, and a second strip extending longitudinally of the core and in superposed relation to said first elongated strip and substantially embedded in the flux sheathing with portions of said second elongated strip exposed at the surface of the flux sheathing and in which said second elongated strip is of tortuous form to extend about opposite sides of said first elongated strip in superposed relation thereto.

3. A welding wire of the character disclosed and which has an elongated core with an enveloping sheathing of flux material, an elongated strip extending longitudinally of the core and substantially embedded in the flux sheathing, which strip is of tortuous form to extend about opposite sides of the core and having portions thereof in contact with the core, and a second strip extending longitudinally of the core and in superposed relation to said first elongated strip and substantially embedded in the flux sheathing with portions of said second elongated strip exposed at the surface of the flux sheathing and which has portions thereof disposed in traversing overlay on portions of said first strip.

4. A welding wire of the character disclosed and which has an elongated core with an enveloping sheathing of flux material, and an elongated strip extending longitudinally of the core and substantially embedded in the flux sheathing, which strip is of bent form to provide laps extending laterally of the length of the strip, and having portions of said laps in contact with said core.

5. A welding wire as set forth in claim 4 and in which the contacting portions of said laps have substantial areas of contacting surface for affording substantial areas of contact with said core.

6. A welding wire of the character disclosed and which has an elongated core with an enveloping sheathing of flux material, and an elongated strip extending longitudinally of the core and substantially embedded in the flux sheathing, which strip is of bent form to provide laps extending laterally of the length of the strip, and having portions of said laps in contact with said core, and a second elongated strip extending longitudinally of the core and composed of an element which is of bent form to provide laps extending laterally of the length of said second strip and having portions of said laps exposed at the surface of said flux sheathing.

7. A welding wire as set forth in claim 6 and in which the contacting portions of said laps have substantial areas of contacting surface.

8. A welding wire as set forth in claim 6 and in which said laps are curved to extend across a side of said core and to opposite side portions of said core.

9. A welding wire as set forth in claim 6 and in which said laps are curved to extend across a side of said core and to opposite side portions of said core and also in which said laps of said strips are disposed for the laps of the second strip traverses the laps of the first strip.

10. A welding wire as set forth in claim 6 and in which the contacting portions of said laps have substantially areas of contacting surface and in which said laps are curved to extend across a side of said core and to opposite side portions of said core.

11. A welding wire as set forth in claim 6 and in which the contacting portions of said laps have substantially areas of contacting surface and in which said laps are curved to extend across a side of said core and to opposite side portions of said core, and also in which said laps of said strips are disposed for the laps of the second strip traverses the laps of the first strip.

ALBERT M. ROSS.

REFERENCES CITED

The following references are of record in the file of this patent:

UNITED STATES PATENTS

| Number | Name | Date |
| --- | --- | --- |
| 1,387,157 | Jones | Aug. 9, 1921 |
| 1,517,311 | Motte | Dec. 2, 1924 |
| 1,525,840 | Weed | Feb. 10, 1925 |
| 1,699,438 | Meinhardt | Jan. 15, 1929 |
| 1,734,932 | Weed | Nov. 5, 1929 |
| 1,768,998 | Ross | July 1, 1930 |
| 1,980,890 | Tompkins | Nov. 13, 1934 |
| 2,430,701 | Bernard | Nov. 11, 1947 |

FOREIGN PATENTS

| Number | Country | Date |
| --- | --- | --- |
| 415,035 | Great Britain | Aug. 14, 1934 |